George M. P'Simer
INVENTOR.

Sept. 13, 1966 G. M. P'SIMER 3,272,554
CAR SEAT FOR INFANTS WITH SEAT ANCHOR
Filed Dec. 29, 1964 2 Sheets-Sheet 2

George M. P'Simer
INVENTOR.

BY Clarence A. O'Brien
and Harvey B. Jackson
Attorneys 3,272,554
CAR SEAT FOR INFANTS WITH SEAT ANCHOR
George M. P'Simer, Harvey Cedars, N.J., assignor to Holdtite Corporation, a corporation of New Jersey
Filed Dec. 29, 1964, Ser. No. 421,761
1 Claim. (Cl. 297—256)

The present invention generally relates to a seat for infants in the form of a car seat having structural features which enable the infant car seat to be detachably supported from the upper edge of an automobile or the like with the present invention having particular novelty in the provision of an anchoring device attached to the instant car seat which serves to lock the pivotal backrest portion of an automobile seat so that it cannot pivot forwardly when the automobile decelerates thereby serving as a safety device for retaining the automobile seat backrest in upright position and at the same time retaining the infant car seat on the upper edge portion of the automobile seat backrest.

Many present-day automobiles have split front seats or bucket-type seats in which the backrest portion folds or pivots forwardly about a transverse axis at or adjacent the bottom end of the backrest portion and the rear edge of the seat portion of the automobile seat. Such seats are usually constructed to facilitate passenger ingress and egress in relation to the back seat of the automobile. However, persons desiring to convey small children or infants in such an automobile find it quite difficult to effectively support an infant's car seat on the pivotal backrest of this type of automobile inasmuch as braking of the automobile or other rapid deceleration thereof will cause the inertia forces created by movement of the infant and the infants car seat will cause the foldable backrest to pivot forwardly and sometimes subjecting a child in the infant's car seat to injury by falling forwardly into the floorboard area or in impact with the dashboard which sometimes has rigid projections thereon which can cause severe injury to a small child.

Accordingly, it is the primary object of the present invention to provide an anchor device associated with the infant car seat which serves not only to secure the infant's car seat to the upper edge portion and against the front surface of a pivotal backrest of the automobile seat but also will securely lock the pivotal or foldable backrest of a split back seat or bucket seat structure so that it cannot pivot forwardly even in the event of severe braking action or sudden deceleration. The seat anchor not only serves as a safety device for the infant in the seat but also any passengers that may be riding in the back seat of the automobile will be protected inasmuch as the rigidly locked backrest will form a barrier to prevent the back seat passengers from being projected forwardly against the dashboard, windshield or the like.

Still another object of the present invention is to provide a seat anchor for an infant's car seat in accordance with the preceding object in which the seat anchor is in the form of an angulated rigid member having adjustment features for enabling the device to be adjusted for optimum use with seats having various size and inclination characteristics.

Still another feature of the present invention is to provide a seat anchor for infant's car seat which is detachably connected to the infant's car seat to enable selective use thereof and also to facilitate assembly of the anchor with the car seat and vehicle seat.

Yet another feature of the present invention is to provide an anchor for a seat of the split back or bucket type and at the same time an anchor for an infant's car seat mounted thereon with a portion of the anchor becoming permanently affixed to the car seat to further enable the assembly of the car seat and the seat anchor to be easily carried out by persons normally unskilled in the mechanical are thereby rendering the device easy to use, effective for its particular purposes and relatively inexpensive to manufacture while being extremely safe in use.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
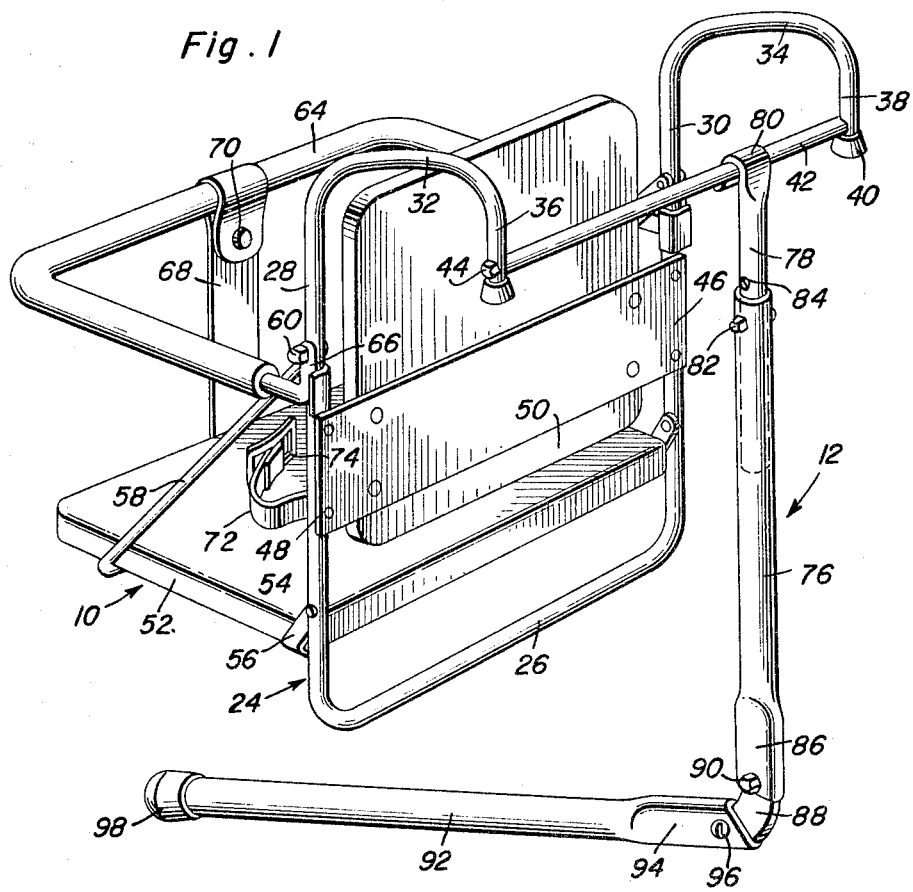
FIGURE 1 is a perspective view of the infant car seat of the present invention with the seat anchor of the detachable-type connected thereto.

Referring now specifically to the drawings, the numeral 10 generally designates the infant's car seat of the present invention while the anchor of the present invention is generally designated by the numeral 12. The infant's car seat is associated with an automobile seat or similar seat generally designated by the numeral 14 which includes a bottom stationary seat portion 16 and a pivotal backrest 18 that is pivotal about a horizontal pivot axis generally at the bottom edge of the backseat 18 or at the rear edge of the portion 16. The seat portion 16 of the automobile seat 14 is mounted by a conventional adjustable supporting means 20 which forms no part of the present invention but which usually enables forward and rearward adjustment of the automobile seat and some instances enables adjustment of the automobile seat vertically in relation to the floorboard 22. The particular construction of the automobile seat forms no particular part of the present invention except that it is necessary for the seat portion 16 of the automobile seat to be spaced slightly above the floorboard 22 as is conventional in present-day automobile constructions.

The infant's car seat includes a back frame 24 including a horizontally disposed bottom rail 26 and upstanding parallel side rails 28 and 30 normal to the bottom rail 26 and disposed in spaced parallel relation to each other. The upper ends of the side rails 28 and 30 terminate in rearwardly extending hook-shaped portions 32 and 34 which terminate in downturned end portions 36 and 38 having a closure grommet 40 on the lower end thereof such as a plastic tip used to close the end of a tubular member. The back frame 24 is preferably a tubular member of any suitable construction and the downturned end portions 36 and 38 are rigidly but detachably interconnected by a rear horizontal rail 42 secured in place by suitable fasteners 44 thus rigidifying the back frame so that it will hang over the top edge of the backrest 18 in the conventional manner illustrated in FIGURE 3.

Extending between the central portion of the vertical side rails 28 and 30 is a supporting member 46 secured to the rails 28 and 30 by suitable fasteners 48. Attached to the supporting member 46 is a backrest panel 50 that may be provided with suitable padding and covering material as desired. The panel 50 is in the form of a backrest for the infant's car seat.

A seat panel 52 extending forwardly from the back frame 24 and is pivotally attached thereto by pivot fasteners 54 by virtue of L-shaped brackets 56. The bottom panel 52 may also be provided with suitable padding and covering material compatible with the structure of the back supporting panel.

For supporting the outer end of the pivotal bottom panel 52, there is provided a generally U-shaped supporting brace 58 having the ends thereof pivotally attached to the side rails 28 and 30 by a fastening bolt 60. The bight portion of the U-shaped supporting brace 58 is engaged detachably with a spring clip 62 under the central forward portion of the bottom panel 52 to enable the bottom panel to fold upwardly to a collapsed position or be secured frictionally in generally perpendicular relation to the back frame 24.

A generally U-shaped retaining yoke 64 is pivotally attached to the side rails 28 and 30 by the pivot bolts 60 for pivoting movement to a position alongside of the upper portion of the side rails 28 and 30. The ends of the yoke 64 are offset at 66 with this offset length being variable to enable the yoke to be swung upwardly to a position to enable a child to more easily egress from the infant's seat when desired. At the center of the bottom panel 62, a flexible crotch strap 68 is attached which extends up to the center of the yoke 64 and extends therearound and is secured in such position by a detachable fastener 70 such as a heavy duty snap fastener or other equivalent fastening means so that when the infant has one leg on either side of the crotch strap, he will be effectively retained within the infant's seat. The yoke 64 is provided with suitable cushioning material thereon such as cushioned foam rubber, foam plastic or the like enclosed with a fabric or plastic cover. Also, for retaining a child in the infant's seat, a flexible belt 72 is attached to the back supporting panel 50 and a suitable buckle structure 74 is provided for connecting the ends of the belt component 72 for further securing the child in the car seat.

Figure 3:
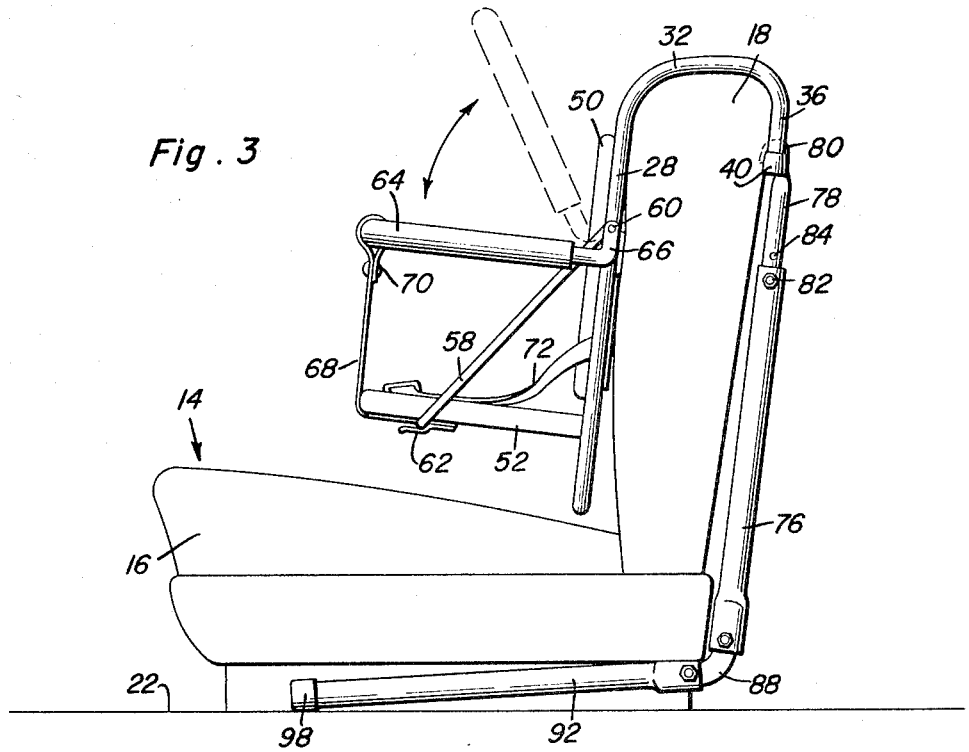
FIGURE 3 is a side elevational view of the car seat and seat anchor of the present invention illustrating the association of the seat anchor with the infant's car seat and the automobile seat construction.
Figure 4:
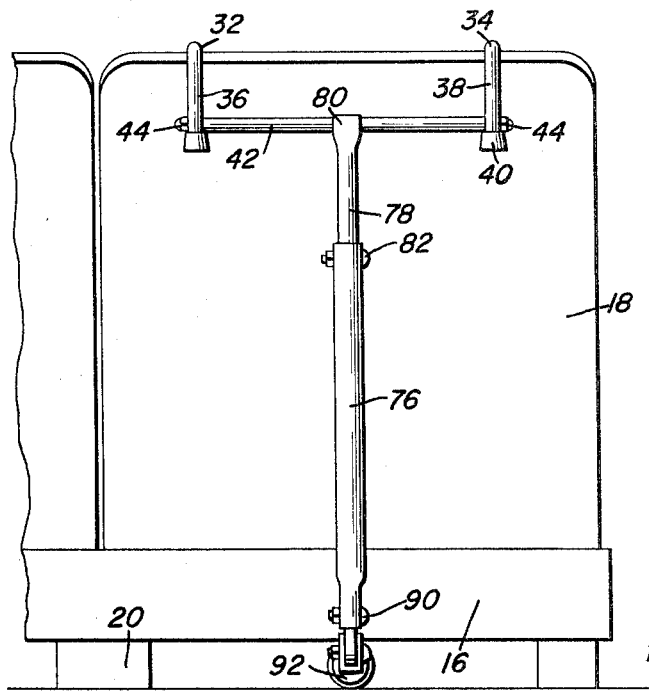
FIGURE 4 is a rear elevational view of the construction of FIGURE 3.

The seat anchor 12 includes a first tubular portion 76 telescoping over a depending tubular member 78 which has a hook 80 formed on the upper end thereof by flattening the end of the tubular member 78 and deforming it into a hook shaped configuration for hooking over the rear rod or tubular member 42 as illustrated in FIGURE 1. A fastening bolt 82 extends through the telescoped sections of the tubular member 76 and the tubular member 78 and is engaged with one of a plurality of longitudinally spaced apertures 84 in the tubular member 78 thus enabling the over-all length of the tubular member 76 and 78 to be adjusted. The lower end of the tubular member 76 is flattened at 86 and is connected to an angulated plate 88 by a fastening bolt 90. A second or lower tubular member 92 extends forwardly from the lower end of the tubular member 76 and the rear end thereof is flattened as at 94 and this is secured to the angulated connector plate 88 by a fastener bolt 96. The forward end of the tubular member 92 is provided with a rubber clutch tip or plastic tip 98 which closes the tubular member and also engages the floor surface of the floorboard 22 as illustrated in FIGURE 3. The juncture between the tubular members 76 and 92 is formed by the connector plate 88 which also engages the back lower corner of the seat portion of the automobile seat while the tubular member 76 and the tubular member 78 extends generally upwardly alongside of and parallel to the rear surface of the backrest portion 18. Thus, with the tubular member 92 angling downwardly from the lower corner of the seat portion 16 or the frame therefor and the forward tip end 98 engaging the floorboard in the manner illustrated in FIGURE 3, the seat backrest 18 is prevented from forward pivoting movement about a pivot axis that is disposed forwardly of and above the rear lower corner of the seat portion which is engaged by the connector plate 88 between the tubular members 76 and 92 as illustrated in FIGURE 3. Thus, the anchor device 12 not only retains the infant's car seat 10 on the backrest portion 18 of the automobile seat from pivoting forwardly. By varying the length of the tubular member 76 by adjusting it in relation to the tubular member 78, the anchor device of the present invention may be associated with various types of vehicular seat structures whether they be the split back type or the bucket-seat type. In addition, the seat anchor may be used to merely retain the infant's car seat in place if it is used with a bench-type seat in which the backrest portion is rigidly mounted in relation to the seat portion.

Figure 2:
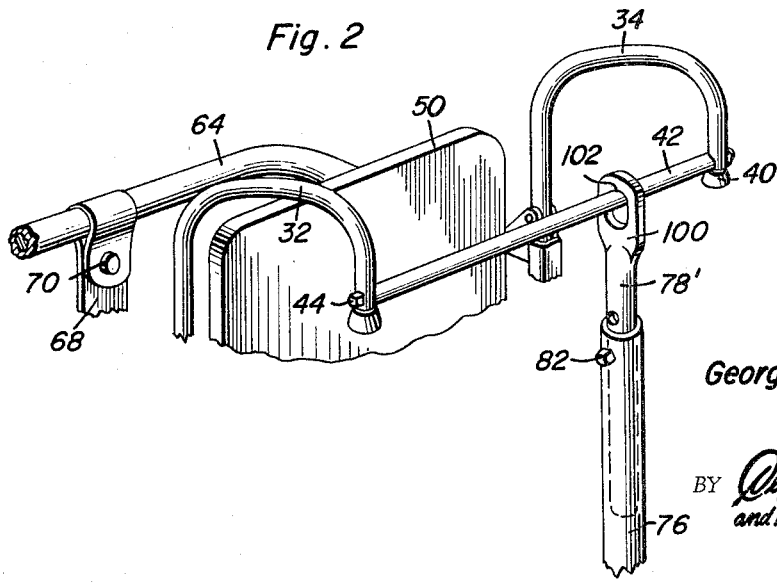
FIGURE 2 is a partial perspective view similar to FIGURE 1 but illustrating the seat anchor of a permanent type attached to the car seat.

FIGURE 2 illustrates a slightly modified form of the invention in which the infant's car seat is exactly the same and the tubular member 76 is exactly the same. However, the tubular member 78' is slightly different but it is associated with the tubular member 76 in exactly the same adjustable manner. However, the upper end of the tubular member 78' is flattened as at 100 and the flattened portion 100 is provided with a longitudinally elongated slot-like opening 102 which is disposed in encircling relation to the rear rail 42 of the infant's car seat thus becoming a permanent part of the car seat. The assembly of the device is facilitated by the fasteners 44 at the ends of the rear tubular rail 42 of the infant's car seat and in this form of the invention, if it is desired to remove the major portion of the seat anchor, it is only necessary to remove the adjustment securing bolt 82 or the like. Otherwise, the structure is the same but in this form of the invention, the seat anchor or at least a portion thereof becomes a permanent part and is permanently attached to the infant's car seat although it can be removed if desired for storage, packing or shipment when deemed desirable.

While a single anchor device has been illustrated, it is pointed out that two anchor devices of the nature illustrated may be employed if desired with one of the anchor devices adjacent each end of the tubular back rail 42. Also, while the device has been illustrated with a split back rest, it could also be used with a bucket-type seat or even a bench type seat where it is desirable to maintain the infant's car seat in place. However, with the seat having a pivotal backrest portion, the seat anchor not only serves to retain the infant's car seat in place but also serves to retain the backrest portion of the vehicle seat in locked condition.

In situations where bucket seats are employed in the automobile, the infant's seat may be mounted with one of the hook-type supports 32 and 34 engaging over the inner top edge portions of the adjacent seat with car seat being disposed over the console or drive tunnel normally extending between the bucket seat. In this condition, two seat anchors would be necessary such as illustrated in either form of the invention with the seat anchors extending under the respective bottom portions or seat portions of the bucket seats thus not only serving to secure the infant's car seat in place to prevent lateral shifting thereof and to prevent removal thereof from the backrest portions but also serve to lock both of the backrest portions of the bucket seats in locked condition so that they cannot pivot forwardly until the anchor device or anchor devices have been released from connection with the backrail 42 or otherwise adjusted so that it can be retracted from under the bucket seats.

The various structural components may be of any suitable material such as aluminum, chromium plated tubes or the like for forming a highly attractive infant's seat with the anchoring device enhancing the appearance characteristics thereof. Suitable padding and covering material may be employed wherever desired so that the seat may have any suitable decorative appearance facilities desired for providing not only a highly utilitarian and safely used item but one which is attractive in appearance as well.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A car seat assembly for use on a vehicle having a split backrest seat assembly which includes a stationary seat portion and a pivotal backrest portion, an infant's car seat comprising a back frame adapted to extend along the front surface of the backrest portion of the seat assembly of the vehicle, said back frame including spaced hook-shaped elements at the upper end thereof adapted to engage over the upper portion of the backrest portion of the seat assembly, a back panel attached to said back frame, a seat panel attached to said back frame, and yoke retaining means attached to said back frame forming an assembly for receiving an infant whereby the infant is normally supported forwardly of the backrest portion of the seat assembly and is subjected to injury in the event the backrest portion of the seat assembly is pivoted forwardly due to sudden deceleration of the vehicle, an anchor assembly connected to the infant's car seat, said anchor assembly including a rail interconnecting the hook-shaped elements, an elongated vertically extending rigid member connected to the rail and adapted to extend downwardly alongside of the rear surface of the backrest portion of the vehicle seat assembly, and a forwardly extending generally horizontally disposed rigid member rigid with the lower end of the vertically extending member and generally equal in length thereto and adapted to extend forwardly in underlying relation to a major portion of the front to back dimension of the seat portion of the seat asembly, the backrest portion of the seat assembly thus being precluded from forward tilting movement, the upper end of said vertically extending rigid member being flattened and having a downwardly opening hook formed therefrom and in detachable engagement with said rail and retaining the vertically extending rigid member perpendicular thereto and preventing rotation about its longitudinal axis, said vertically extending rigid member including a pair of telescopic tubular members, means releasably securing the telescopic tubular members in longitudinally adjusted position, said means including alignable diametric openings in the tubular members and a fastening bolt extending through the openings to prevent relative rotation of the tubular members about a longitudinal axis, the lower end of the lowermost of said telescopic tubular members being flattened, said forwardly extending rigid member being tubular and having the rear end thereof flattened, the major dimension of the flattened rear end of the forwardly extending rigid member being substantially vertical and perpendicular to the rail, the major dimension of the flattened lower end of the vertically extending rigid member being disposed in substantially the same vertical plane as the major dimension of the flattened rear end of the forwardly extending member, and an angulated connector plate extending into and conforming with the flattened ends, and means releasably securing the connector plate to the flattened ends thereby retaining the forwardly extending rigid member in underlying relation to the seat portion of the seat assembly in generally perpendicular relation to the rail.

References Cited by the Examiner

UNITED STATES PATENTS

| 1,792,489 | 2/1931 | Gilmore | 287—54 |
| 2,066,227 | 12/1936 | Reukauf | 287—54 |
| 2,281,220 | 4/1942 | Anderson | 287—54 |
| 2,888,061 | 5/1959 | Berlin | 297—256 |
| 2,990,009 | 6/1961 | Moeller | 297—385 |
| 3,061,371 | 10/1962 | Benoit | 297—256 |
| 3,132,896 | 5/1964 | Hamilton | 297—256 |
| 3,144,273 | 8/1964 | P'Simer et al. | 297—254 |
| 3,166,355 | 1/1965 | Rocker | 297—256 |

FOREIGN PATENTS

| 876,586 | 5/1953 | Germany. |
| 586,412 | 3/1947 | Great Britain. |

FRANK B. SHERRY, *Primary Examiner.*

F. K. ZUGEL, *Assistant Examiner.*